(12) United States Patent
Veng (10) Patent No.: US 6,543,942 B1
(45) Date of Patent: Apr. 8, 2003

(54) DISPERSION-COMPENSATING FIBER SYSTEM HAVING A BRIDGE FIBER AND METHODS FOR MAKING SAME

(75) Inventor: Torben E. Veng, Broendby (DK)

(73) Assignee: Fitel USA Corp., Norcross, GA (US)

( * ) Notice: Subject to any disclaimer, the term of this patent is extended or adjusted under 35 U.S.C. 154(b) by 39 days.

(21) Appl. No.: 09/667,031

(22) Filed: Sep. 21, 2000

(51) Int. Cl.⁷ .............................................. G02B 6/255
(52) U.S. Cl. ........................... 385/95; 385/96; 385/98; 385/123; 385/127
(58) Field of Search .................... 385/95–99, 123, 385/127; 219/121, 494; 65/406, 407

(56) References Cited

U.S. PATENT DOCUMENTS

| | | | |
|---|---|---|---|
| 4,879,454 A | * 11/1989 | Gerdt | 219/494 |
| 4,958,905 A | * 9/1990 | Tynes et al. | 385/96 |
| 5,016,971 A | * 5/1991 | Hsu et al. | 219/121.63 |
| 5,074,633 A | * 12/1991 | Cohen et al. | 385/43 |
| 5,360,464 A | * 11/1994 | Yamauchi et al. | 65/410 |
| 5,933,561 A | * 8/1999 | Sugizaki | 385/123 |

FOREIGN PATENT DOCUMENTS

JP     08-190030     * 7/1996

OTHER PUBLICATIONS

"New technique for reducing the splice loss to dispersion compensating fiber", European Conference on Optical Communication, 1996, Bent Edvold and Lars Gruner–Nielsen.*

* cited by examiner

Primary Examiner—Hemang Sanghavi
Assistant Examiner—Scott A Knauss
(74) Attorney, Agent, or Firm—Priest & Goldstein, PLLC (57) ABSTRACT

An optical transmission line with reduced splice loss, and methods for fabricating an optical transmission line with reduced splice loss, are described. In one described method, a length of dispersion-compensating fiber, or other suitable first transmission fiber, is spliced to a first end of a length of a bridge fiber. The splice is heated to a maximum temperature to cause a measurable reduction in splice loss. The temperature of the splice is then ramped down to room temperature, such that the reduction in splice loss is maintained. A second end of the bridge fiber is then spliced to a length of a second transmission fiber. Further described is a technique for determining the maximum temperature for heating the splice between the first transmission fiber and the bridge fiber.

13 Claims, 9 Drawing Sheets

| TIME (SEC.): | CURRENT (A): |
|---|---|
| 0 | 0.0 |
| 1 | 11.5 |
| 41 | 10.5 |
| 51 | 9.5 |
| 54 | 9.0 |
| 57 | 8.5 |
| 60 | 8.0 |
| 63 | 7.5 |
| 66 | 7.0 |
| 69 | 6.5 |
| 72 | 6.0 |
| 77 | 5.5 |
| 82 | 5.0 |
| 87 | 3.5 |
| 92 | 2.0 |
| 97 | 0.5 |
| 100 | 0.0 |

| SPLICE LOSS BEFORE HEAT TREATMENT (dB): | SPLICE LOSS AFTER HEAT TREATMENT (dB): |
|---|---|
| 0.17 | 0.10 |
| 0.37 | 0.13 |
| 0.33 | 0.10 |
| 0.32 | 0.10 |
| 0.31 | 0.18 |
| 0.27 | 0.17 |
| 0.27 | 0.10 |
| 0.24 | 0.09 |
| 0.28 | 0.06 |
| 0.29 | 0.19 |
| 0.34 | 0.16 |
| 0.30 | 0.10 |
| 0.35 | 0.12 |
| 0.37 | 0.15 |
| 0.37 | 0.18 |
| 0.44 | 0.16 |
| 0.45 | 0.17 |
| AVERAGE VALUES : | |
| 0.32 | 0.13 |

DISPERSION-COMPENSATING FIBER SYSTEM HAVING A BRIDGE FIBER AND METHODS FOR MAKING SAME

BACKGROUND OF THE INVENTION

1. Field of the Invention

The present invention relates generally to improvements to optical fiber transmission lines, and more particularly to advantageous aspects of a dispersion-compensating fiber system having a bridge fiber and methods for making same.

2. Description of the Prior Art

As optical data transmission lines increase in length and in the amount of data that they carry, there is increasing interest in the development of new types of optical fiber and in techniques that can be used to refurbish already existing transmission lines. One important parameter of an optical transmission line is the amount of signal dispersion resulting from the optical characteristics of the materials used to construct the line. A new class of fibers has recently been developed known as dispersion-compensating fiber (DCF), which has a steeply sloped, negative dispersion characteristic.

One application for DCF fiber is to upgrade already existing fiber optic communication links. These already existing links are typically constructed using standard single-mode fibers (SMF) having dispersion characteristics that are optimized for operation at a signal wavelength of 1310 nm. However, certain applications require optimization of a communication link for operation at a longer wavelength, particularly where the communication link spans great distances. For example, one wavelength-division multiplexing (WDM) technique currently in use requires optimization of the link for operation at a wavelength of 1550 nm.

It is possible to refurbish an already existing SMF fiber transmission line optimized for operation at a given wavelength, such as 1310 nm, by splicing a length of DCF fiber into the transmission line. The length of the DCF fiber added to the SMF fiber transmission line is precisely calculated to produce an adjustment in the overall dispersion characteristics of the line such that it is now optimized for operation at a different desired wavelength, such as 1550 nm. A suitable technique for precisely calculating a length of DCF fiber to be spliced into an already existing line in order to optimize the line for operation at a different wavelength is disclosed in U.S. patent application Ser. No. 09/596,454, filed on Jun. 19, 2000, assigned to the assignee of the present application, the drawings and disclosure of which are hereby incorporated by reference in their entirety.

In addition to dispersion, a second important parameter for DCF fiber is the fiber's loss value, that is, the amount of excess signal loss resulting from the introduction of the DCF fiber into a transmission link. Optimally, a DCF fiber should provide a highly negative dispersion, while only introducing a small excess loss to the fiber link. A useful index of the performance of a DCF fiber is the so-called "figure of merit" (FOM), which is defined as the dispersion of the fiber divided by the attenuation.

Another important issue arising in connection with DCF fiber is the excess loss that results when DCF fiber is spliced to a standard single-mode fiber (SMF). To obtain a highly negative dispersion, DCF fiber uses a small core with a high refractive index, having a mode-field diameter of approximately 5.0 $\mu$m at 1550 nm, compared with the approximately 10.5 $\mu$m mode-field diameter of SMF fiber at 1550 mn. The difference in core diameters results in significant signal loss when a fusion splicing technique is used to connect DCF fiber to SMF fiber. It is possible to reduce the amount of signal loss by choosing splicing parameters that allow the core of the DCF fiber to diffuse, thereby causing the mode-field diameter of the DCF core to taper outwards, resulting in a funneling effect. However, the amount and duration of the heat required to produce the funneling effect result in an undesirable diffusion of dopant in the ring of refractive material surrounding the DCF fiber core. This diffusion of ring dopant limits the amount of splice loss reduction that can be obtained using a mode-field expansion technique. For example, using DCF fiber with a FOM of 200 ps/nm/dB, the splice loss typically cannot be reduced below 0.7–0.8 dB when splicing directly to SMF fiber.

There is thus a need for improved techniques for splicing DCF fiber to SMF fiber that reduces splice loss below current limits.

SUMMARY OF THE INVENTION

The above-described issues and others are addressed by the present invention, aspects of which provide an optical transmission line with reduced splice loss and methods for fabricating an optical transmission line with reduced splice loss. In a method according to the present invention, a length of dispersion-compensating fiber, or other suitable first transmission fiber, is spliced to a first end of a length of a bridge fiber. The splice is heated to a maximum temperature to cause a measurable reduction in splice loss. The temperature of the splice is then ramped down to room temperature, such that the reduction in splice loss is maintained. A second end of the bridge fiber is then spliced to a length of a second transmission fiber. A further aspect of the invention provides a technique for determining the maximum temperature for heating the splice between the dispersion-compensating fiber and the bridge fiber.

Additional features and advantages of the present invention will become apparent by reference to the following detailed description and accompanying drawings.

DETAILED DESCRIPTION

Aspects of the present invention provide an optical transmission line with reduced splice loss and methods for fabricating an optical transmission line with reduced splice loss. According to one aspect of the invention, a length of bridge fiber (BF) is introduced between a length of DCF fiber (or other suitable first transmission fiber) and a length of SMF fiber or other suitable second transmission fiber, such as, for example, True-Wave fiber or Large Effective Area fiber. As described in further detail below, the BF fiber is fabricated such that, with the use of suitable first and second sets of splicing parameters, the BF fiber can be spliced to both the DCF fiber and SMF fiber with significantly reduced loss at each splice, thereby resulting in a combined fiber line that exhibits lower splice loss than a line fabricated from DCF and SMF fibers without a BF fiber. Splice loss at the splice between the dispersion-compensating fiber and the bridge fiber is then further reduced by heating the splice to a predetermined temperature and cooling the splice using a predetermined temperature ramp.

Figure 1:
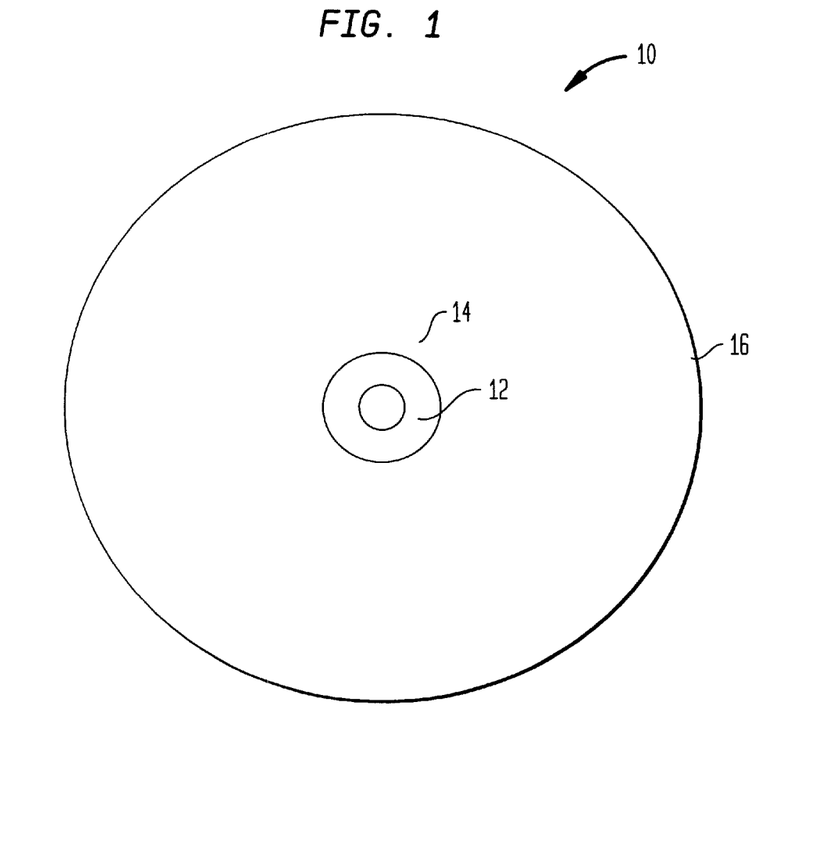
FIG. 1 shows a transverse cross section, not drawn to scale, of a length of dispersion-compensating fiber (DCF).

FIG. 1 shows a transverse cross section, not drawn to scale, of a length of DCF fiber 10. As shown in FIG. 1, the design of the DCF fiber 10 is based on a small diameter core 12, typically approximately 5 µm, compared with a core diameter of approximately 10 µm for SMF fiber. The DCF fiber core 12 has been doped with a high level of germanium oxide ($GeO_2$) to have a high refractive index. Surrounding the core is a ring 14, which has been doped with a high concentration of fluorine (F) to have a low refractive index. The core 12 and ring 14 are encased in a layer of overcladding 16.

Figure 2:
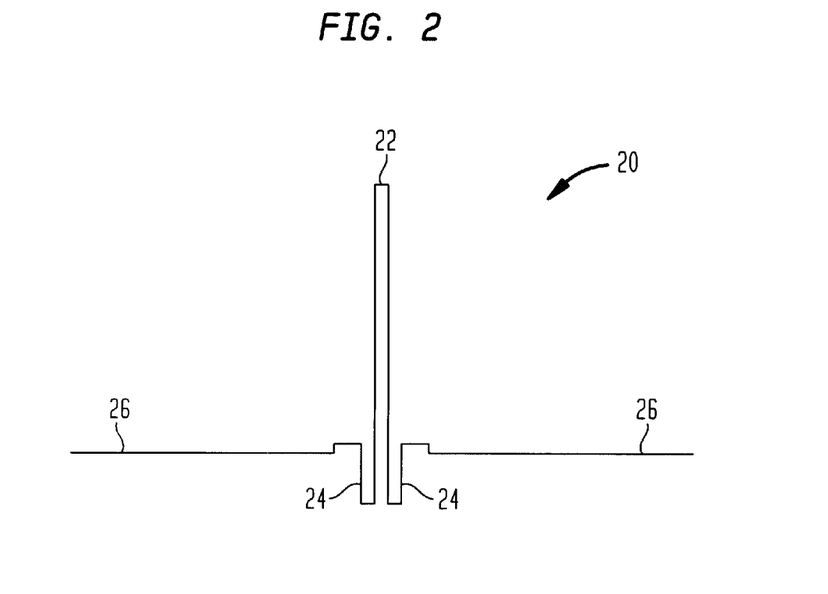
FIG. 2 shows a refractive index profile of the DCF fiber shown in FIG. 1.

FIG. 2 shows a refractive index profile 20 for the DCF fiber 10 shown in FIG. 1. As shown in FIG. 2, the refractive index profile 20 includes a central spike 22, representing the high refractive index of the DCF fiber core 12. On either side of the spike 22 are sharp dips 24, representing the low refractive index of the ring 14. Finally, on either side of the sharp dips 24 are flat regions 26, representing the refractive index of the overcladding 16. The DCF fiber 10 whose structure and refractive index profile are illustrated in FIGS. 1 and 2 typically exhibits a dispersion at 1550 nm of approximately −100 ps/km/nm, with a loss of approximately 0.5 dB/km.

Theory predicts that the splicing of this particular DCF fiber 10 to a length of typical SMF fiber will result in a splice loss of approximately 2.2 dB. This loss results from the mismatch of the mode-field distribution in the splice region. However, this splice loss can be reduced by using a fusion splicing technique in which the splicing parameters are chosen to allow a tapered mode-field expansion of the core of the DCF fiber, producing a "funneling" effect that reduces the mismatch between the DCF fiber core and the SMF fiber core.

Figure 3:
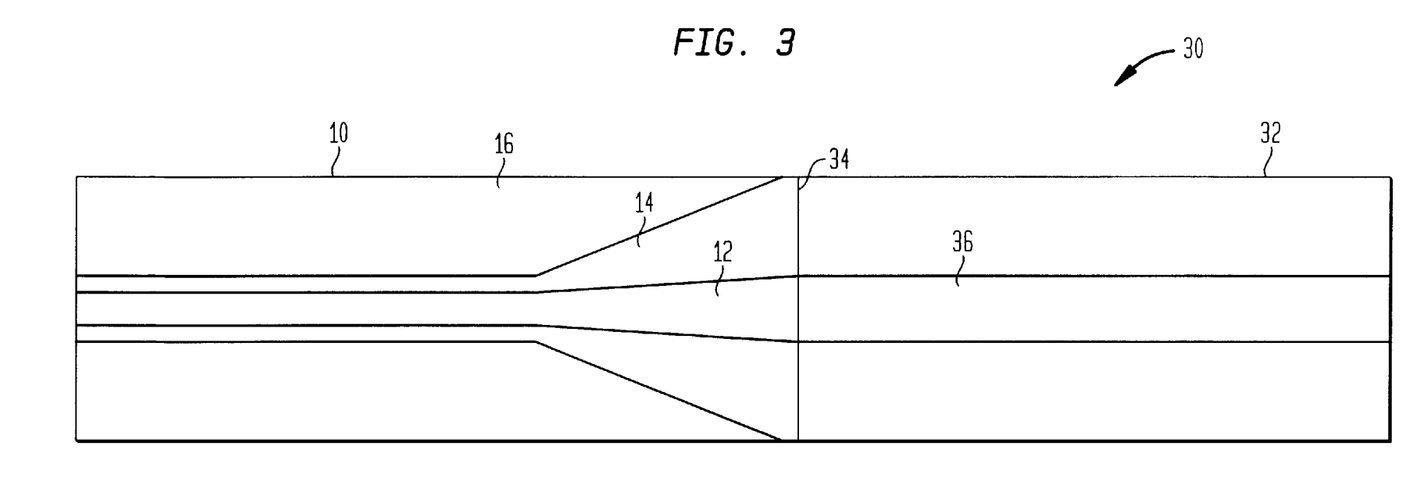
FIG. 3 shows an axial cross section, not drawn to scale, of a transmission line fabricated from a length of DCF fiber that has been spliced to a length of single-mode fiber (SMF).

Specifically, when DCF fiber is fusion spliced, splicing parameters may be chosen such that the amount and duration of the heat generated by the splicing process will cause the $GeO_2$ in the core 12 to diffuse, altering the refractive index profile of the fiber and the mode-field distribution in the splice region. The amount of diffusion can be controlled by optimizing the splice parameters. Thus, using optimized splice parameters, the DCF fiber core 12 can be tapered outward in the splice region to better match the SMF. This is illustrated in FIG. 3, not drawn to scale, which shows an axial cross section of a transmission line 30 fabricated from a length of the DCF fiber 10 shown in FIG. 1 spliced to a length of SMF fiber 32. As shown in FIG. 3, the DCF fiber core 12 tapers outwards as it approaches the splice point 34, such that it approximates the diameter of the core 36 of the SMF fiber 32.

Using this technique, it is possible to lower the splice loss from the theoretically predicted value of 2.2 dB to approximately 0.7–0.8 dB. It is believed, however, that the amount of splice loss reduction using a direct splicing technique is limited by the high mobility of fluorine during the splicing process. In particular, fluorine begins to diffuse at a temperature much lower than the highest temperatures reached during fusion splicing. Because of the relatively high concentration of fluorine dopant in the ring 14 surrounding the core 12 in the DCF fiber 10, the ring 14 will diffuse at a faster rate than the core 12, which in turn tends to increase splice loss. FIG. 3, not drawn to scale, schematically illustrates the relatively greater dispersion of the ring 14 relative to the core 12.

Figure 4:
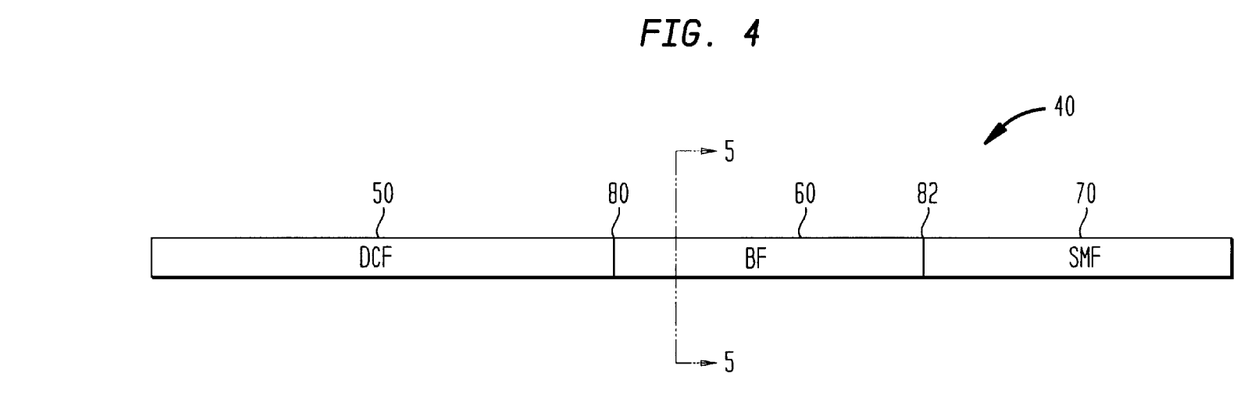
FIG. 4 shows a diagram, not drawn to scale, of an optical fiber transmission line according to a first aspect of the present invention, fabricated from a length of DCF fiber, a length of a bridge fiber (BF), and a length of SMF fiber that have been spliced together.

One technique that is currently used to reduce splice loss is to introduce a bridge fiber (BF) between the DCF and SMF fibers. FIG. 4 shows a diagram of a transmission line 40 incorporating this technique. The transmission line includes a length of DCF fiber 50 (or other suitable first transmission fiber), a length of BF fiber 60, and a length of SMF fiber 70 (or other suitable second transmission fiber). As mentioned above, other suitable second transmission fibers include, for example, True-Wave fiber or Large Effective Area fiber. A first end of the BF fiber 60 is spliced to the DCF fiber 50 at a first splicing point 80, and a second end of the BF fiber 60 is spliced to the SMF fiber 70 at a second splicing point 82. As discussed below, it has been found that the introduction of the BF fiber 60 between the DCF fiber 50 and the SMF fiber 70 may be used to reduce the splice loss to as little as 0.4 dB, which is significantly lower than the 0.7–0.8 dB splice loss obtainable without the use of a BF fiber 60.

Figure 5:
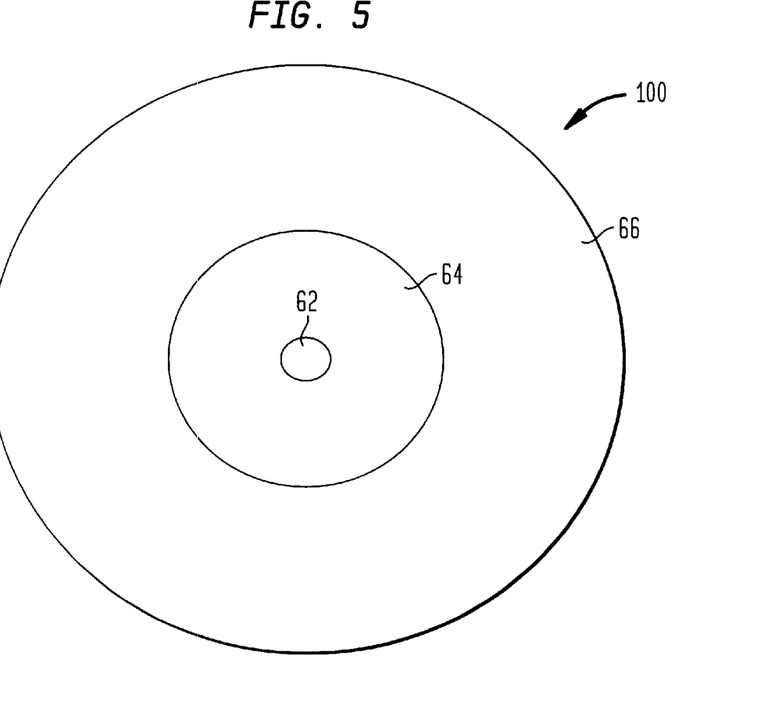
FIG. 5 shows a transverse cross section, not drawn to scale, of a BF fiber suitable for use in the transmission line shown in FIG. 4.
Figure 6:
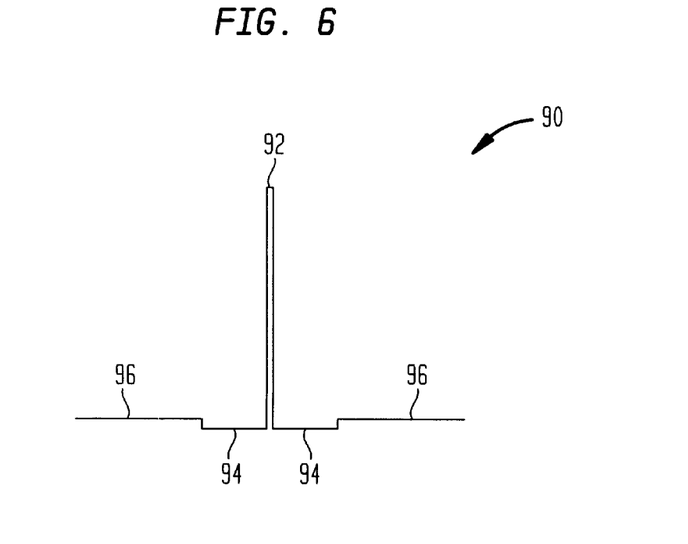
FIG. 6 shows a refractive index profile of the BF fiber shown in FIG. 5.

FIG. 5 shows a cross section of the BF fiber 60 taken through the plane 5—5, and FIG. 6 shows a refractive index profile 90 for the BF fiber 60. The core 62 of the BF fiber is similar to the DCF fiber core 12 illustrated above in FIGS. 1 and 2. It is doped with $GeO_2$ at the same concentration as the DCF fiber core 12, and has substantially the same diameter, approximately 5 µm. However, the ring 64 surround the BF fiber core 62 differs from the ring 14 surrounding the DCF fiber core 12. First, the BF ring 64 has a larger diameter than the DCF ring 14. Second, although both rings 14 and 64 are doped with fluorine (F), the concentration of fluorine in the BF ring 64 is lower than the concentration of fluorine in the DCF ring 14. The overcladding 66 of the BF fiber 60 is similar to the overcladding 16 of the DCF fiber 10.

Thus, the BF refractive index profile 90 shown in FIG. 6 has a different shape than the DCF refractive index profile 20 shown in FIG. 2. Because the BF core 62 is similar to the DCF core 12 in diameter and dopant concentration, the central peak 92 of the BF refractive index profile is similar to the central peak 22 of the DCF refractive index profile 20. However, because of the larger diameter and lower dopant concentration of the BF ring 64, compared with the diameter and dopant concentration of the DCF ring 14, the dips 94 on either side of the central peak 92 in the BF refractive index profile 90 are wider and shallower than the dips 24 on either side of the central peak 22 in the DCF refractive index profile 20. Because the BF overcladding 66 is similar to the DCF overcladding 16, the flat outer regions 96 of the BF refractive index profile 90 are similar to the flat outer regions 26 of the DCF refractive index profile 20.

Figure 7:
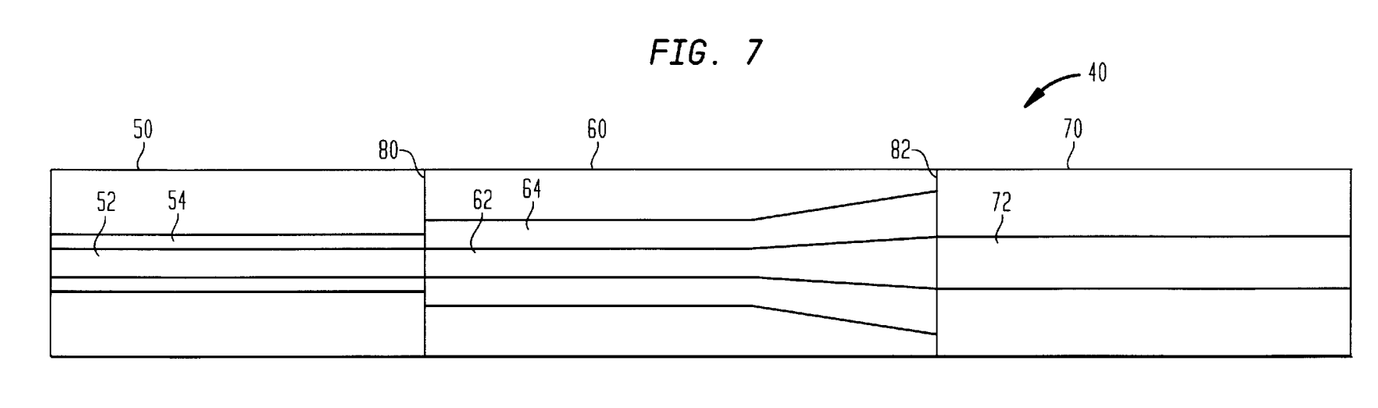
FIG. 7 shows an axial cross section, not drawn to scale, of the optical fiber transmission line shown in FIG. 4.

The diameter and dopant concentration of the BF ring 64 are chosen such that overall splice loss can be reduced by choosing a suitable first set of splicing parameters for the splice 80 between the DCF and BF fibers 50 and 60 and a suitable second set of splicing parameters for the splice 82 between the BF and SMF fibers 60 and 70. FIG. 7 shows an axial cross section, not drawn to scale, of the transmission line 40 shown in FIG. 4. As shown in FIG. 7, because the DCF core 52 and the BF core 62 have similar diameters, no mode-field expansion is required. Thus, it is possible to select splicing parameters for the first splice 80 that minimize or eliminate diffusion of the fluorine dopant in the DCF ring 54. As further illustrated in FIG. 7, because of the relatively low concentration of fluorine dopant in the BF ring 64, there is less diffusion of the BF ring 64 when the BF fiber 60 is spliced to the SMF fiber 70. It is therefore possible to select splicing parameters for the second splice 82 that allow for the full mode-field expansion required to match the BF core 62 to the SMF core 72 without the splice loss associated with excessive diffusion of the fluorine dopant.

It should be noted that the particular BF fiber design described herein is one of a number of different designs for BF fiber that have proven to be suitable for use with the present invention. For example, it is possible to use a BF fiber having a core similar to the core 62 of the above-described BF fiber, but without the fluorine-doped ring portion 64. It will be appreciated that alternative BF fiber designs may be used without departing from the spirit of the present invention. Also, as mentioned above, the present invention can be used with other splice combinations, including, for example, combinations using True-Wave fiber or Large Effective Area fiber in place of the SMF fiber 70.

Figure 8:
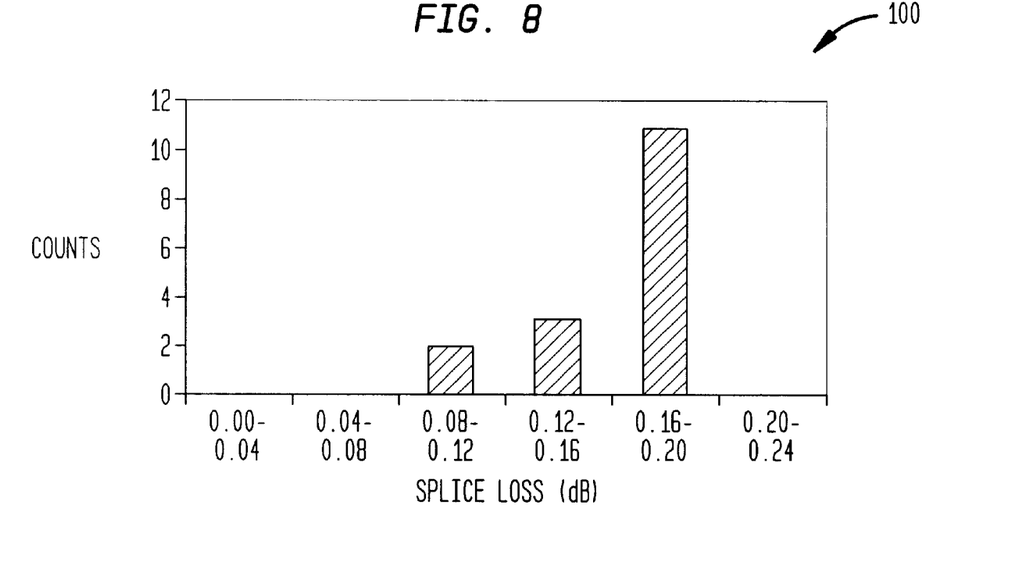
FIG. 8 shows a bar graph illustrating the splice loss distribution for the splice between the DCF fiber and the BF fiber in the transmission line illustrated in FIG. 4.
Figure 9:
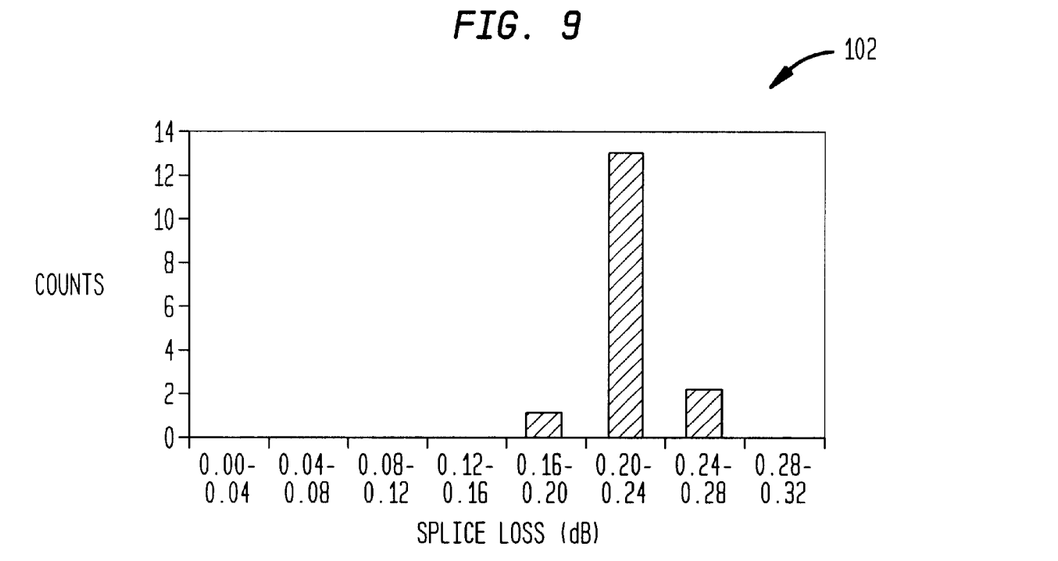
FIG. 9 shows a bar graph illustrating the splice loss distribution for the splice between the BF fiber and the SMF fiber in the transmission line illustrated in FIG. 4.

By optimizing the splicing parameters, a first end of the BF fiber 60 can be spliced to DCF fiber 50 with an average loss as low as 0.17 dB, and a second end of the BF fiber 60 can be spliced to an SMF fiber 70 with an average loss as low as 0.23 dB. Thus, using the BF fiber 70 as a bridge fiber between the DCF fiber 50 and the SMF fiber 60, it is possible to reduce the total splicing loss to approximately 0.4 dB. FIG. 8 is a graph 100 showing the splice loss distribution for the splice between the DCF fiber 50 and the BF fiber 60. The average splice loss is 0.169 dB and the standard deviation is 0.031 dB. FIG. 9 is a graph 102 showing the splice loss distribution for the splice between the BF fiber 60 and the SMF fiber 70. The average splice loss is 0.228 dB and the standard deviation is 0.016 dB.

As mentioned above, the parameters used to splice the DCF fiber 50 to the BF fiber 60 are different from the parameters used to splice the BF fiber 60 to the SMF fiber 70. Fluorine dopant begins to diffuse at a lower splice temperature than $GeO_2$, and also diffuses more rapidly than $GeO_2$. Thus, the splicing of the DCF fiber 50 to the BF fiber 60 must be done using a low fusion current and a short fusion time. These parameters allow this first splice 80 to be accomplished with minimal, if any, mode-field expansion and minimal, if any, fluorine diffusion, thus minimizing splice loss. It is also important that the electrodes of the fusion splicer be as clean as possible, as small variations in the splice conditions due to dirty electrodes can result in a significant increase in the splice loss.

The splicing of the BF fiber 60 to the SMF fiber 70 is not as critical with respect to the cleanliness of the electrodes. For this second splice 82, a higher fusion current and a longer fusion time are used to allow the $GeO_2$ in the BF core 62 to diffuse, proximate to the splice 82, such that good tapering is provided from the BF core 62 to the SMF core 72. As shown in FIG. 9, the splice loss has a narrow distribution with a standard deviation of only 0.016 dB.

Figure 10:
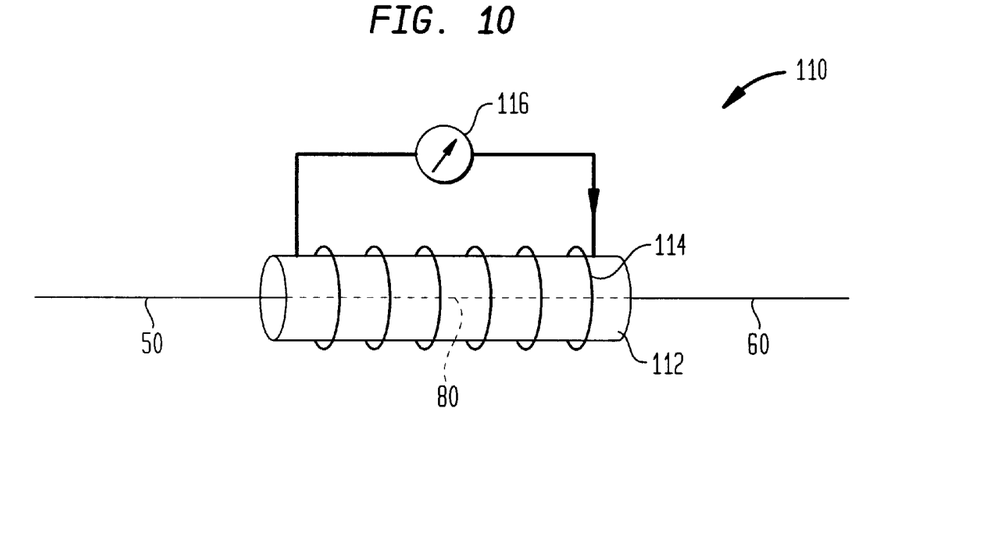
FIG. 10 shows a diagram of a suitable furnace arrangement for heating the splice between the DCF fiber and the BF fiber according to a further aspect of the present invention.

In accordance with an further aspect of the invention, it is possible to reduce the splice loss between the DCF fiber 50 and the BF fiber 60 even further by heating the splice 80 between these two fibers to a predetermined maximum temperature for a predetermined period of time, and then cooling the splice back down to room temperature following a controlled ramp. FIG. 10 shows a diagram of a tube furnace 110 that may be suitably employed to perform this heating process. The furnace includes a ceramic tube 112 surrounding the splice point 80 between the DCF fiber 50 and the BF fiber 60. A heating wire 114 is coiled around the tube 112, and a power supply 116 causes a heating current to flow through the heating wire 114. A suitable material for the heating tube 112 is Degussit ceramic, manufactured by Friatec A G (Germany). Suitable dimensions for the heating tube 112 include an inner circumference of 2 mm, an outer circumference of 3 mm, and a length of 10 mm. A suitable material for the heating wire 114 is 90/10 Pt/Rh, and a suitable wire diameter is 0.5 mm. The length of bare fiber is approximately 2 cm.

After the DCF fiber 50 has been spliced to the BF fiber 60, the two fibers are mounted into the furnace 110 with the splice point 80 located inside the heating tube 112. The splice point 80 is heated to approximately 1100° C. and kept at this temperature for approximately 30 seconds. Heating of the splice 80 causes a measurable decrease in splice loss. The amount of the decrement depends upon the particular design of DCF and BF fibers 50 and 60. It is possible for this splice loss to be maintained at room temperature by ramping down the temperature over a time period of approximately 90 seconds. Because of the small diameter of the DCF and BF fibers 50 and 60 and the heating tube 112, the relatively low specific heat of the materials used to fabricate the fibers 50 and 60 and the heating tube 112, and the relatively large surface area of the fibers 50 and 60 and the heating tube 112, it is possible to implement this heating ramp simply by decreasing the amount of current flowing through the heating wire 114, without the need for an outside cooling mechanism. However, if needed, it would be within the spirit of the invention to add a cooling mechanism, such as a fan, to facilitate the cooling process. Best results are obtained if splice loss is monitored during the heat treatment. The loss reduction effect has been observed in all DCF designs manufactured at Lucent Technologies, including Standard DCF, WideBand DCF, Inverse Dispersion Fiber, and High-Slope DCF.

Returning to FIG. 4, one suitable length that has been used for the BF fiber 70 is approximately 3 meters. The first splice 90, between the DCF fiber 50 and the BF fiber 70 is made on a fusion splicer using a splice time, or fusion time, of approximately 0.2 sec. A splice time significantly longer than 0.2 sec may induce fluorine diffusion in the DCF, which in turn will increase splice loss. Using an Ericsson splicer, the following splicing parameters has been used to produce satisfactory results:

Pre-fusion Time=0.2 sec
Pre-fusion Current=10.0 mA
Gap=50.0 microns
Overlap=5.0 microns
Fusion Time 1=0.3 sec
Fusion Current 1=10.5 mA
Fusion Time 2=0.2 sec
Fusion Current 2=17.5 mA;
Fusion Time 3=0 sec
Fusion Current 3=0 mA.

Figure 11:
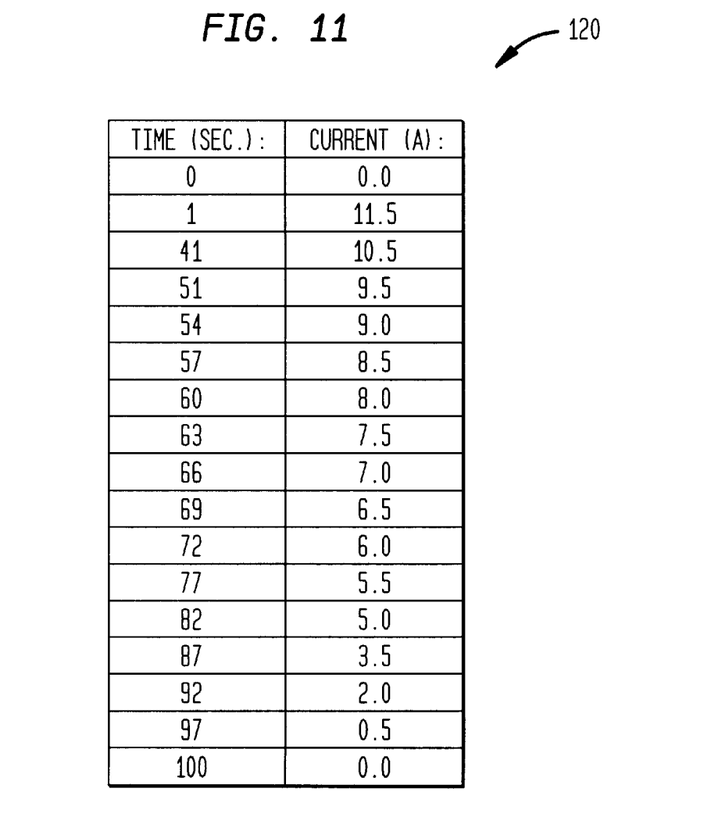
FIG. 11 shows a table setting forth the setpoints used in heating the splice between the DCF fiber and the BF fiber.

FIG. 11 shows a table 120 illustrating a heating current profile used as setpoints to the power supply to obtain the results set forth below. It is also possible to obtain good results by manually adjusting the temperature of the heating tube 112, such as by manually adjusting the current flowing through the heating wire 114, while splice loss is monitored during the heat treatment. After the completion of the heating current profile shown in FIG. 11, the furnace is allowed to cool to ambient temperature for approximately 1 min. The splice 80 and the DCF and BF fibers 50 and 60 are then removed from the furnace. The distal end of the BF fiber 60 is now spliced to the SMF fiber 70, using a second set of parameters, as described above.

Figure 12:
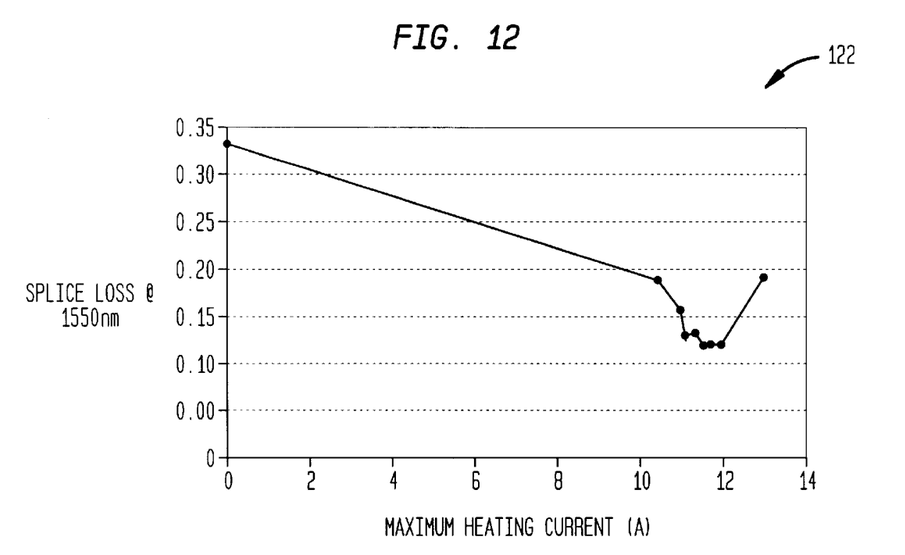
FIG. 12 shows a graph illustrating a technique according to a further aspect of the present invention for determining a maximum temperature to which the splice between the DCF fiber and the BF fiber is to be heated to obtain an optimal reduction in splice loss.

An important parameter is the maximum temperature for the heat treatment illustrated in FIG. 10. This parameter may be determined empirically. A test splice 80 between a DCF fiber 50 and a BF fiber 60 is mounted into the furnace 110 and splice loss is monitored during heating. Several heating trials are now made, in which the maximum heating current is varied (i.e., in which the maximum temperature of the splice is varied) and in which the cooling ramp is kept constant. The ramp can be linear, or may also be non-linear, such as the ramp set forth in the table 120 shown in FIG. 11. If the maximum current is increased for each new trial, the same splice 80 can be used for the experiment. FIG. 12 shows a graph 122 illustrating the trend of splice loss, after cooling, as a function of maximum heating current. From this graph 122, it will be seen that there is an optimal value of maximum current at which the desired splice loss is obtained. After determining the maximum current, the ramp can now be optimized by monitoring splice loss during cooling.

Figure 13:
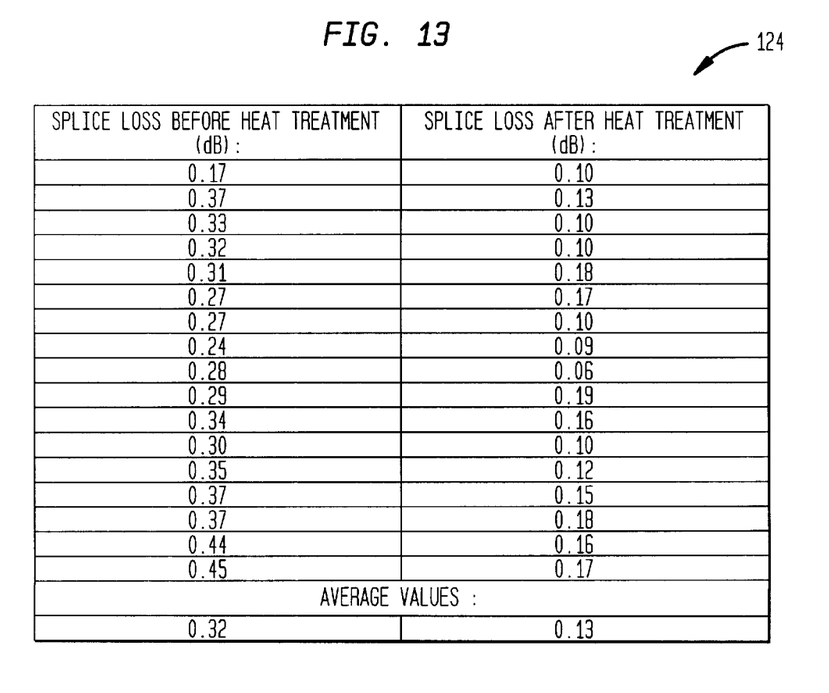
FIG. 13 shows a table setting forth a comparison of the splice loss at the splice between the DCF and BF fiber before and after heating the splice in accordance with the present invention.

FIG. 13 shows a table 124 containing data for splice loss reduction by applying the above-described heat treatment to a WideBand DCF sample manufactured at Lucent Technologies Denmark A/S. The table 124 compares the amount of splice loss at a signal wavelength of 1550 nm before and after heat treatment. At higher wavelengths, the loss reduction is even greater. For example, at a wavelength of approximately 1600 mn, splice loss is reduced several dBs for some DCF designs.

According to a further aspect of the invention, the above-described heat treatment of the splice between the DCF and BF fibers is accomplished using a laser. The use of a laser, as described below, allows the heat treatment to be performed without making physical contact with the splice point. This is useful, for example, in the construction of a high-strength optical transmission line. Another advantage of using a laser is that a very compact heating zone can be obtained. Thus, when the heating zone is provided by a laser, a smaller length of bare fiber (for example, 1 cm) may easily be used.

Figure 14A:
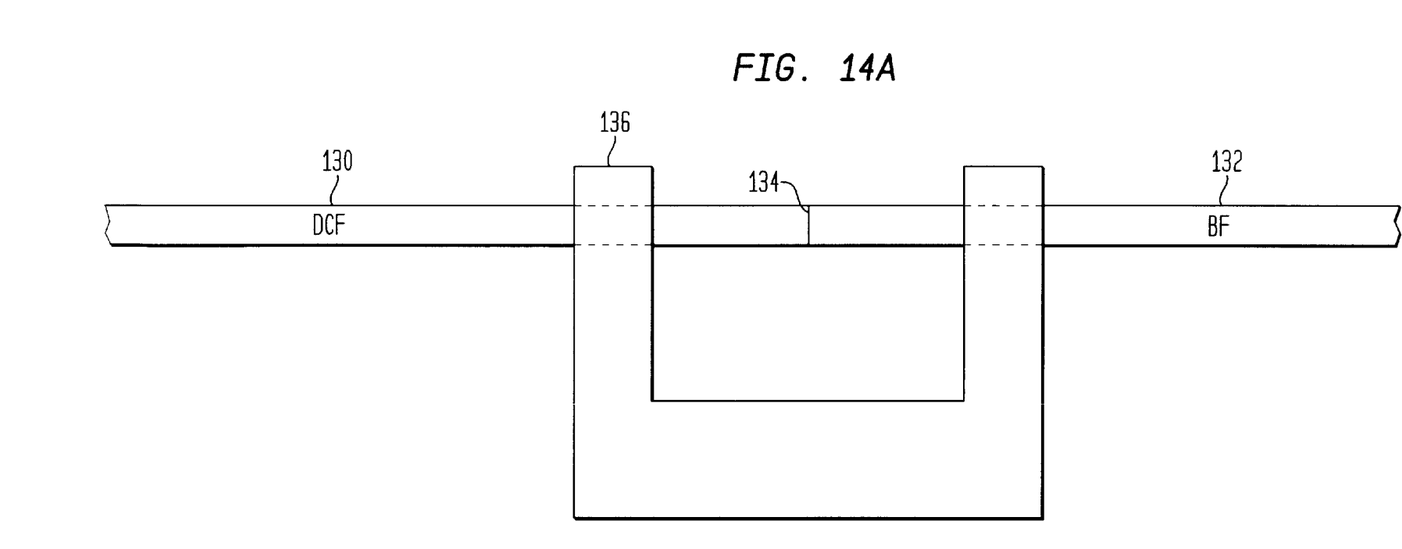
FIG. 14A shows an elevation view of a length of DCF fiber and a length of BF fiber that have been spliced together and mounted into a frame.
Figure 14B:
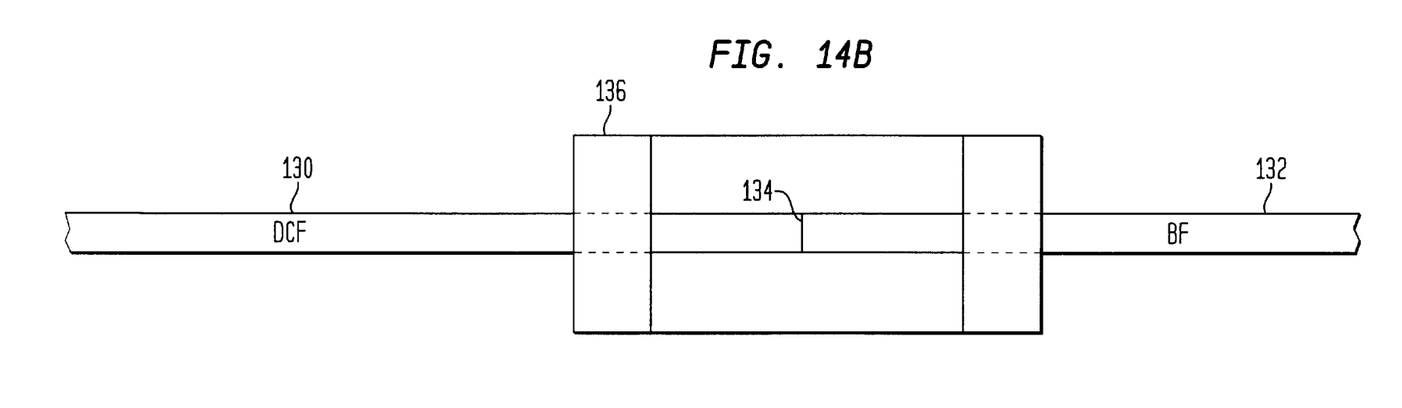
FIG. 14B shows a plan view of the fibers and frame shown in FIG. 14A.
Figure 15:
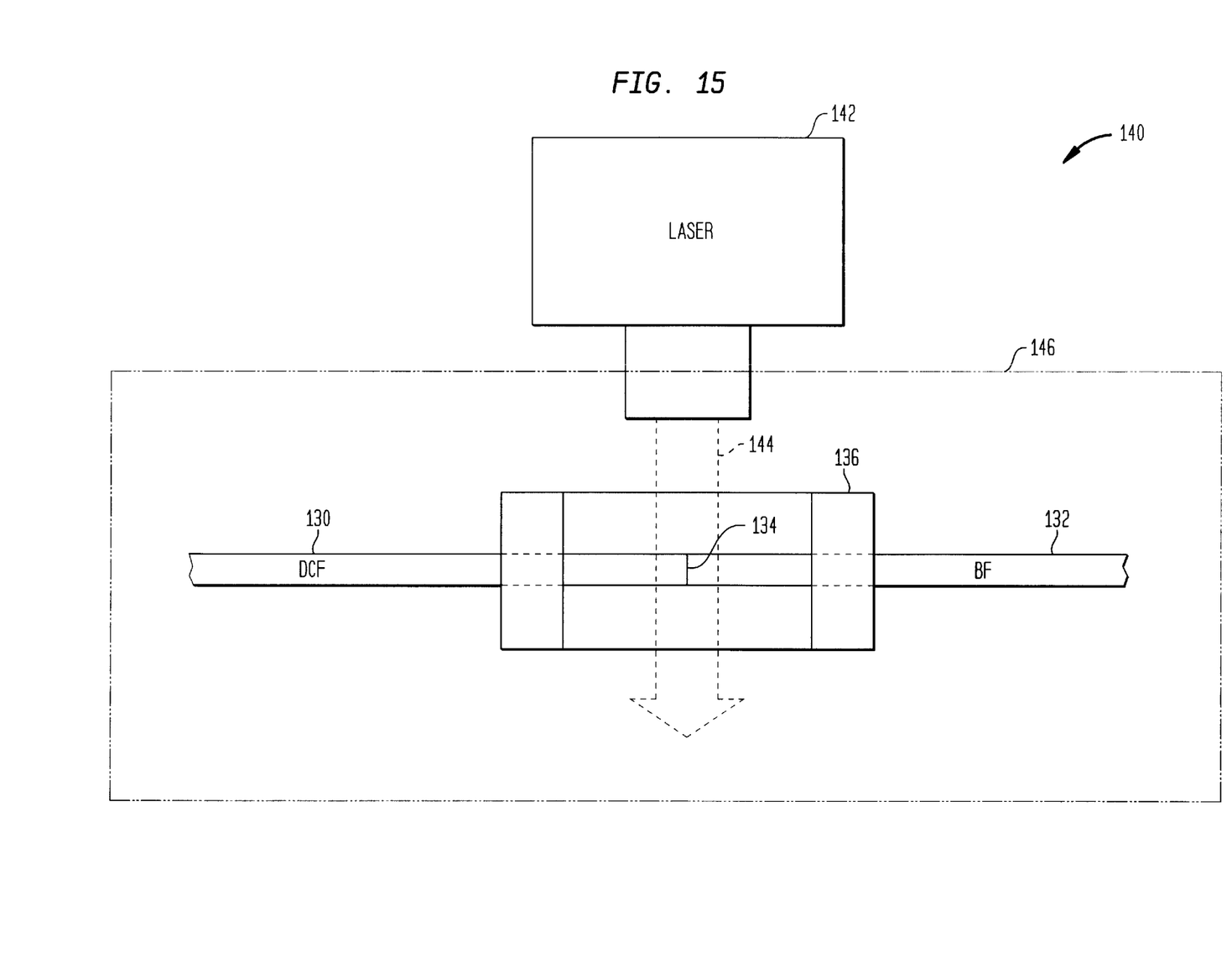
FIG. 15 shows a diagram of a system in which a laser is used to heat the splice between the lengths of DCF and BF fibers shown in FIGS. 14A and 14B.

FIGS. 14A and 14B show, respectively, elevation and plan views of a length of DCF fiber 130 and a length of BF fiber 132 that have been spliced together at a splice point 134 and mounted into a frame 136. FIG. 15 shows a diagram of a laser heating system 140, in which the frame-mounted, spliced DCF and BF fibers 130 and 132 shown in FIGS. 14A and 14B are positioned proximate to a $CO_2$ laser 142, or other laser of suitable power, such that the laser beam 144 emanating from the laser 142 provides the required heating of the splice point 134. The temperature of the splice point 134 is regulated by adjusting the power of the laser beam 144. According to a further aspect of the invention, the spliced fibers 130 and 132 and the frame 136 are housed in a chamber 146 that is filled with a protectant gas, such as nitrogen. Alternatively, the splice point may be purged with a stream of protectant gas during the heat treatment. In this case, the heat treatment may be conducted in a normal ambient atmospheric environment.

It should be noted that the graphical technique illustrated in FIG. 12, described above, for empirically determining an optimal maximum temperature for heating the splice between the DCF and BF fibers can also be used in connection with a laser-heated system, such as the system 140 illustrated in FIG. 15. However, instead of graphing splice loss as a function of maximum heating current, splice loss is instead graphed as a function of maximum laser beam intensity. In all other significant respects, the technique is the same.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for fabricating an optical transmission line comprising:

(a) splicing a length of a dispersion-compensating fiber having a core doped with $GeO_2$, and a ring around the core doped with fluorine, to a first end of a length of a bridge fiber having a core doped with $GeO_2$ having the same diameter and refractive index as the dispersion-compensating fiber core;

(b) heating the splice to a maximum temperature of approximately 1100° C. and kept at that temperature for approximately 30 seconds to cause a measurable reduction in splice loss;

(c) ramping the temperature of the splice down to room temperature, such that the reduction in splice loss is maintained; and (d) splicing a second end of the bridge fiber to a length of a second transmission fiber.

2. The method of claim 1, wherein in step (c) the temperature of the splice is ramped down to room temperature in approximately 90 seconds.

3. The method of claim 1, wherein in step (b) the splice is heated to the maximum temperature by:
placing the splice into a heating tube dimensioned to closely receive the splice; and
causing a heating current to flow through a heating wire coiled around the heating tube.

4. The method of claim 3, wherein in step (c) the temperature of the splice is ramped down to room temperature by controlling the amount of current flowing through the heating wire.

5. The method of claim 1, wherein in step (b) the splice is heated to the maximum temperature by:
mounting the splice into a frame; and
exposing the splice to a laser beam.

6. The method of claim 5, wherein in step (c) the temperature of the splice is ramped down to room temperature by controlling the laser beam intensity.

7. The method of claim 5, further including the step of placing the frame-mounted splice into a chamber containing a protectant gas prior to exposing the splice to the laser beam.

8. The method of claim 5, further including the step of purging the splice point with a stream of protectant gas during the exposure of the splice to the laser beam.

9. A method for fabricating an optical transmission line comprising:
(a) splicing a length of a first transmission fiber to a first end of a length of a bridge fiber;
(b) heating the splice to an optimal maximum temperature to cause a measurable reduction in splice loss by placing the splice into a heating tube dimensioned to closely receive the splice and causing a heating current to flow through a heating wire coiled around the heating tube, the optimal maximum temperature determined by
heating a test splice between the first transmission fiber and the bridge fiber while monitoring splice loss;
performing several heating trials, in which a maximum heating current is varied and in which the splice is cooled using a constant cooling ramp;
graphing splice loss, after cooling, as a function of the maximum current; and
using the graph to determine an optimal value of maximum current at which low splice loss is obtained;
(c) ramping the temperature of the splice down to room temperature, such that the reduction in splice loss is maintained; and
(d) splicing a second end of the bridge fiber to a length of a second transmission fiber.

10. The method of claim 9, wherein the maximum heating current is increased for each new trial, whereby the same splice may be used for each successive heating trial.

11. A method for fabricating an optical transmission line comprising:
(a) splicing a length of a first transmission fiber to a first end of a length of a bridge fiber;
(b) heating the splice to a maximum temperature to cause a measurable reduction in splice loss by mounting the splice into a frame and exposing the splice to a laser beam, an optimal maximum temperature being determined by
heating a test splice between the first transmission fiber and the bridge fiber while monitoring splice loss;
performing several heating trials, in which a maximum laser beam intensity is varied and in which the splice is cooled using a constant cooling ramp;
graphing splice loss, after cooling, as a function of the maximum laser beam intensity; and
using the graph to determine an optimal value of maximum laser beam intensity at which low splice loss is obtained;
(c) ramping the temperature of the splice down to room temperature, such that the reduction in splice loss is maintained; and
(d) splicing a second end of the bridge fiber to a length of a second transmission fiber.

12. The method of claim 11, wherein the maximum laser beam intensity is increased for each new trial, whereby the same splice may be used for each successive heating trial.

13. An optical transmission line comprising:
a dispersion-compensating fiber having a core doped with $GeO_2$, and a ring around the core doped with fluorine;
a length of a second transmission fiber; and
a length of bridge fiber having a core doped with $GeO_2$, having the same diameter and refractive index as the dispersion-compensating fiber core, the bridge fiber having a first end spliced to the dispersion-compensating fiber and a second end spliced to the second transmission fiber,
the bridge fiber having a ring surrounding its core, the bridge fiber ring being doped with fluorine at a lower concentration, and having a larger diameter, than the dispersion-compensating fiber ring;
wherein the splice between the dispersion-compensating fiber and the second transmission fiber has been heated to a maximum temperature to cause a measurable reduction in splice loss and then cooled to room temperature according to a temperature ramp, such that the reduction in splice loss is maintained.

* * * * *